United States Patent [19]
Jeong

[11] Patent Number: 5,791,019
[45] Date of Patent: Aug. 11, 1998

[54] DOUBLE LOCKING DEVICE OF A BELT CLIP

[75] Inventor: Byeong-Ro Jeong, Seoul, Rep. of Korea

[73] Assignee: SamSung Electronics Co., Ltd., Suwon, Rep. of Korea

[21] Appl. No.: 579,821

[22] Filed: Dec. 28, 1995

[30] Foreign Application Priority Data

Dec. 28, 1994 [KR] Rep. of Korea ............... 38085/1994

[51] Int. Cl.$^6$ ............... A45F 5/02; A44B 21/00
[52] U.S. Cl. ............... 24/3.11; 224/670; 224/930
[58] Field of Search ............... 224/667, 666, 224/668, 669, 670, 269, 930; 455/351; 24/3.11, 3.12

[56] References Cited

U.S. PATENT DOCUMENTS

| | | |
|---|---|---|
| 4,083,481 | 4/1978 | Selinko ............... 455/351 |
| 4,299,344 | 11/1981 | Yamashita et al. ............... 455/351 |
| 4,654,631 | 3/1987 | Kurcbart et al. . |
| 4,780,934 | 11/1988 | Vickers et al. . |
| 4,802,241 | 1/1989 | Vickers et al. . |
| 4,828,153 | 5/1989 | Guzik et al. . |
| 4,881,150 | 11/1989 | Oyamada . |
| 4,901,852 | 2/1990 | King . |
| 4,951,817 | 8/1990 | Barletta et al. . |
| 4,956,895 | 9/1990 | Hayasaka . |
| 5,014,046 | 5/1991 | Minami . |
| 5,016,326 | 5/1991 | Goldenberg . |
| 5,081,709 | 1/1992 | Benyo et al. ............... 224/669 |
| 5,159,314 | 10/1992 | Wayne . |
| 5,261,122 | 11/1993 | Otsuki et al. ............... 455/351 |
| 5,261,583 | 11/1993 | Long et al. . |
| 5,307,511 | 4/1994 | Takahashi ............... 455/351 |
| 5,319,349 | 6/1994 | Smith, III . |
| 5,356,060 | 10/1994 | Kuroda . |
| 5,398,855 | 3/1995 | Schaiewitz . |
| 5,426,825 | 6/1995 | Soren et al. . |
| 5,443,193 | 8/1995 | Lenard . |
| 5,488,759 | 2/1996 | Lim et al. ............... 455/351 |
| 5,528,770 | 6/1996 | Castilla et al. ............... 224/667 |

*Primary Examiner*—Linda J. Sholl
*Attorney, Agent, or Firm*—Robert E. Bushnell, Esq.

[57] ABSTRACT

A double locking device of a belt clip having a lever provided with a hinge opening through which a hinge shaft passes; a belt clip holder for engaging the lever with a pager housing, the belt clip holder being provided with the hinge opening, a guide projection, an groove, a hanging rib and a hanging projection; the pager housing including a guide rail into which the guide projection of the belt clip holder slides, a hanging recess, an opening provided with a tension part having a protrusion on a side of the guide rail, and a guide channel situated between the opening and the guide rail; a locker including a protrusion adapted to be in contact with the protrusion of the tension part and a stopper adapted to be slid into the guide channel and to be put into the groove of the belt clip holder, thereby to lock the belt clip holder into the pager housing, the locker being engaged into the opening of the pager housing and locking the belt clip holder slid into the guide rail; and a coil spring having the lever turning elastically around the hinge shaft within a predetermined angle after being engaged with the belt clip holder.

20 Claims, 6 Drawing Sheets

DOUBLE LOCKING DEVICE OF A BELT CLIP

CROSS-REFERENCE TO RELATED APPLICATIONS

This application makes reference to, incorporates the same herein and claims all benefits accruing under 35 U.S.C. §119 from an application entitled DOUBLE LOCKING DEVICE OF A BELT CLIP earlier filed in the Korean Industrial Property Office on the 28th day December in the year 1994, and there duly assigned Ser. No. 38085/1994.

BACKGROUND OF THE INVENTION

The present invention relates to a belt clip device for attaching communications equipment such as a radio pager, to the waist belt of a user, and more particularly, to a clip using a double locking device that is easily attachable to and detachable from the housing of an item of communications equipment, and that after being attached to a person's waist belt, will not become accidentially detached from the belt.

A belt clip for an item of communications equipment such as a radio pager or the like, should, for purposes of convenience, be easily attachable to and detachable from the body of the exterior housing for the pager, if necessary, according to the consumer's desire and, after attached to a person's belt, will not be detached from the belt by the external impact or force.

Conventional designs for a belt clip attachable device for portable communications equipment tend to rely upon a C-shaped support provided with a guide rail and an opening formed in a back side of the housing of the equipment. Conventional belt clips for portable communicating equipment are constructed with a holder for engaging the belt clip. The housing has a slide, and a hanging projection locks into an opening by virtue of the elasticity of the body of the equipment, in order to support a hanging loop.

I have discovered that contemporary designs for conventional belt clips attachable to portable communications equipment have been plagued by a problem of security because their locking device is apt to be easily loosened by external impact or by variations between the dimensions of the elastic body of the equipment, thereby allowing inadvertent detachment of the hanging loop from the body of the housing, thereby resulting in the disengagement and subsequent loss, or damage, of the communication equipment.

SUMMARY OF THE INVENTION

Accordingly, an object of the present invention is to provide an improved locking device for a belt clip for securing communications equipment to the person of a user.

It is another object to provide a double locking device for a belt clip to prevent the communication equipment from being detached due to application of an external force to the housing of the communications equipment.

It is still another object to provide a double locking device able to assure certain locking and easy operation by a user, and to prevent the equipment from becoming lost or damaged through carelessness of the user.

In order to accomplish these and other objects, a double locking device for a belt clip is provided to enable reliable and secure attachment of communication equipment to the person of a user. The device may be constructed with a belt clip including a hinge opening through which a hinge shaft passes; a belt clip holder for attaching the belt clip to the housing of the communications equipment. The belt clip holder is provided with the hinge opening, a guide projection, a groove, a hanging rib and a hanging projection. The housing of the communications equipment includes a guide rail into which the guide projection of the belt clip holder slides, a hanging recess, an opening provided with a tension part having a protrusion on a side of the guide rail, and a guide channel situated between the opening and the guide rail. A lock includes a protrusion adapted to contact the protrusion of the tension part, and a stopper is positioned to slide into the guide channel and to engage the groove in the belt clip holder. Movement of the stopper along the guide channel and into the groove locks the belt clip holder into the housing of the communications equipment with the lock engaging the opening in the housing of the communications equipment and locking the belt clip holder slid into the guide rail. A coil spring accommodates, but biases against, rotation of the belt clip around the hinge shaft within a predetermined angle after being engaged with the belt clip holder.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 9 is a sectional view of the cam activated locking mechanism in the second open region, taken along line V—V' of FIG. 3.

DETAILED DESCRIPTION OF THE PREFERRED EMBODIMENT

Figure 1:
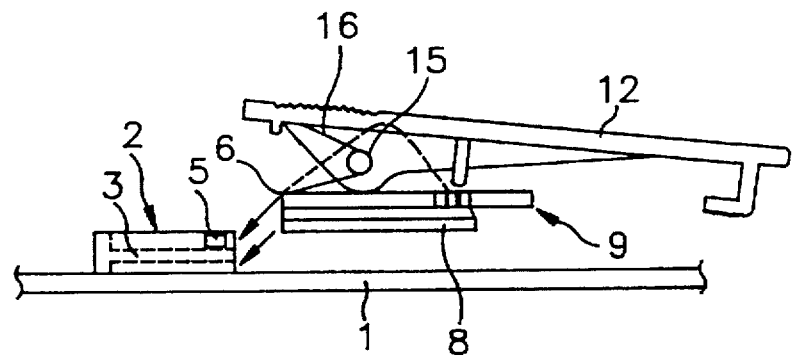
FIG. 1 a side view illustrating a construction of an abstract representation of a conventional belt clip.
Figure 2:
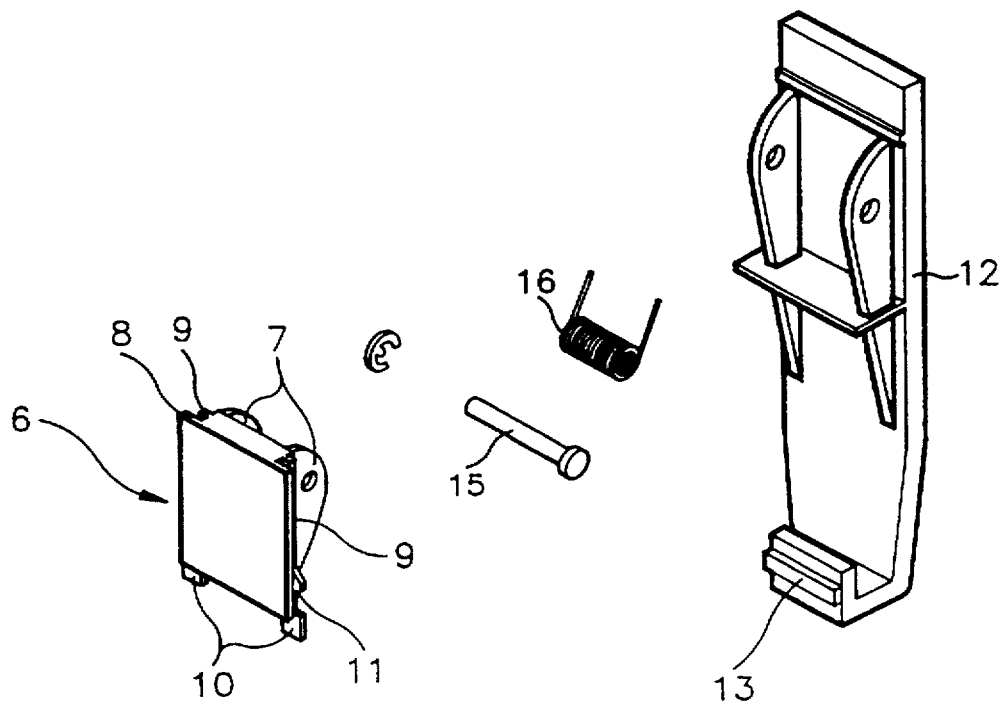
FIG. 2 is an exploded perspective view illustrating an abstract representation of a belt clip and a slider for a conventional device.

Turning now to the drawings, FIGS. 1 and 2 show an abstract representation of conventional belt clips attachable device for portable communicating equipment. These clips have a construction that a C-shaped holding support 2 provided with a guide rail 3 and a hanging opening 5 is mounted on a back side of the pager housing of the communicating equipment, and a hinge part 7 and an elastic pager body 9 provided with a hanging projection 11 and a pushing part 10 are integrally formed on a bottom portion 8 of a slider 6. The belt clip 12 is integrally formed with a hanging loop 13 is seated on the slider 6 by a pin 15 through a coil spring 16. As shown in FIGS. 1 and 2, the conventional belt clip attachable device for portable communicating equipment is constructed with a belt clip holder 2 for engaging the belt clip 12 with the pager housing I fitted with the slider 6 and the hanging projection 11 is locked into the hanging opening 5 by the elastic pager body 9, to support the hanging loop 13. Such conventional belt clips for portable communicating equipment has a problem because locking is apt to be easily loosened by external impact or a variation of the dimensions during manufacture of the elastic pager body, thereby detaching the hanging loop from the pager body, so that the communicating equipment becomes lost or damaged.

As shown in FIGS. 3, 4, 5 and 6, a double locking device constructed according to the principles of the present invention has a lever 78 including a hinge opening 80 through which a hinge shaft 82 passes; a belt clip holder 64 for engaging lever 78 with a pager housing 50 so that the lever 78 is turned around a hinge shaft 82 within a predetermined angle. A belt 94 extends between lever 78 and the pager housing 50 containing the belt clip holder 64. The belt clip holder 64 is provided with a hinge opening 66 through which the hinge shaft 82 passes such as the hinge opening 80, a guide projection 68 which is slid into the second open region 92 of pager housing 50, an groove 70 which is formed at one side of the guide projection 68, a elastic hanging rib 72 which is situated in a center of the belt clip holder 64, and a hanging projection 74 which is integrally formed on a end of the elastic hanging rib 72. The second open region 92 of pager housing 50 includes a guide rail 52 into which the guide projection 68 of the belt clip holder 64 is slid, a hanging recess 54 into which a hanging projection 74 of the belt clip holder 64 is put around a top portion and a center portion between the left and right of the guide rail 52, an first open region 56 which is provided with a tension part 58 having a protrusion 60 is formed at one side of the guide rail 52. A guide channel 62 is formed between the first open region 56 and the guide rail 52. A lock (or thumblatch) 84 including a protrusion 86 adapted to contact protrusion 60 of the tension part 58, and a stopper 88 adapted to slide into the guide channel 62 and to be put into the groove 70 of the belt clip holder 64 into the pager housing 50, in order to lock belt clip holder 64. The lock engages the first open region 56 of the pager housing 50 and locks the belt clip holder 64 slid into the guide rail 52. A coil spring 76 biases lever 78 elastically around the hinge shaft within a predetermined angle after being engaged with the belt clip holder 64.

Figure 7:
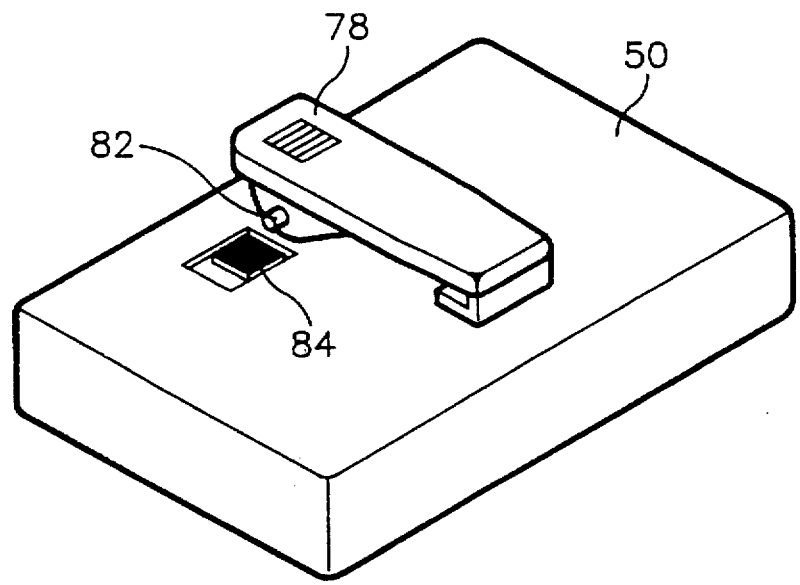
FIG. 7 is a perspective assembly view illustrating a double locking device for a belt clip constructed according to the principles of the present invention.
Figure 8:
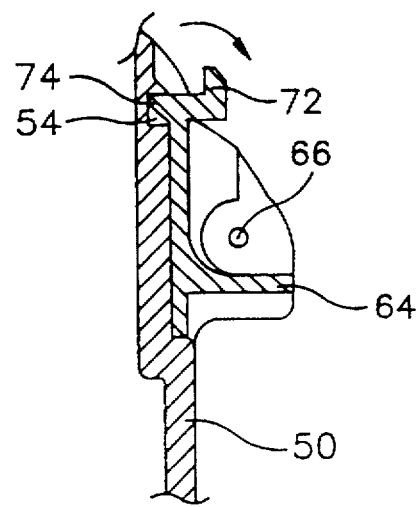
FIG. 8 is a side sectional view illustrating an assembly of a belt clip holder and a pager housing constructed according to the principles of the present invention.

As shown in FIGS. 7 and 8, there is provided the double locking device of the lever 78 constructed according to the principles of the present invention, wherein the coil spring 76 is situated between the lever 78 and the belt clip holder 64 and the hinge shaft 82 passes through the respective hinge openings 66 and 80, to engage the lever 78 with the belt clip holder 64. Also, the belt clip holder 64 is slid into the guide rail 52 of the pager housing 50 with the aid of the guide projection 68 so that the hanging projection 74 of the hanging rib 72 is put into the hanging recess 54, and the lock 84 is engaged with the first open region 56 of the pager housing 50 so that the stopper 88 of the lock 84 is slid into the guide channel 62 of the pager housing 50 and the protrusion 86 of the lock 84 is adapted to be in contact with the protrusion 60 of the tension part 58.

In the meanwhile, operation steps of the case wherein the belt clip holder 64 is engaged with the pager housing 50 are described with reference to FIG. 3. At first, lever 78 is engaged with the belt clip holder 64 and then guide projection 68 of the belt clip holder 64 is slid into the guide rail 52, thereby to elastically hook the hanging projection 74 of the belt clip holder 64 into the hanging recess 54 of the pager housing 50. And then, if lock 84 is moved to a locking position, the stopper 88 of the lock 84 is hooked into the groove 70 of the belt clip hold 64 along the guide channel 62 of the pager housing 5, in order to prevent the belt clip holder 64 from being detached from the pager housing 50.

To the contrary, operational steps of the case where the belt clip holder 64 is disengaged from the pager housing 50 are described. After the lock 84 is moved to a loosing position, the hanging rib 72 having the hanging projection 74 of the belt clip holder 64 is put up in arrow direction (shown in FIG. 8), and then the belt clip holder 64 is pushed upward, so that the belt clip holder 64 is disengaged from housing 50 of the communications equipment.

Figure 3:
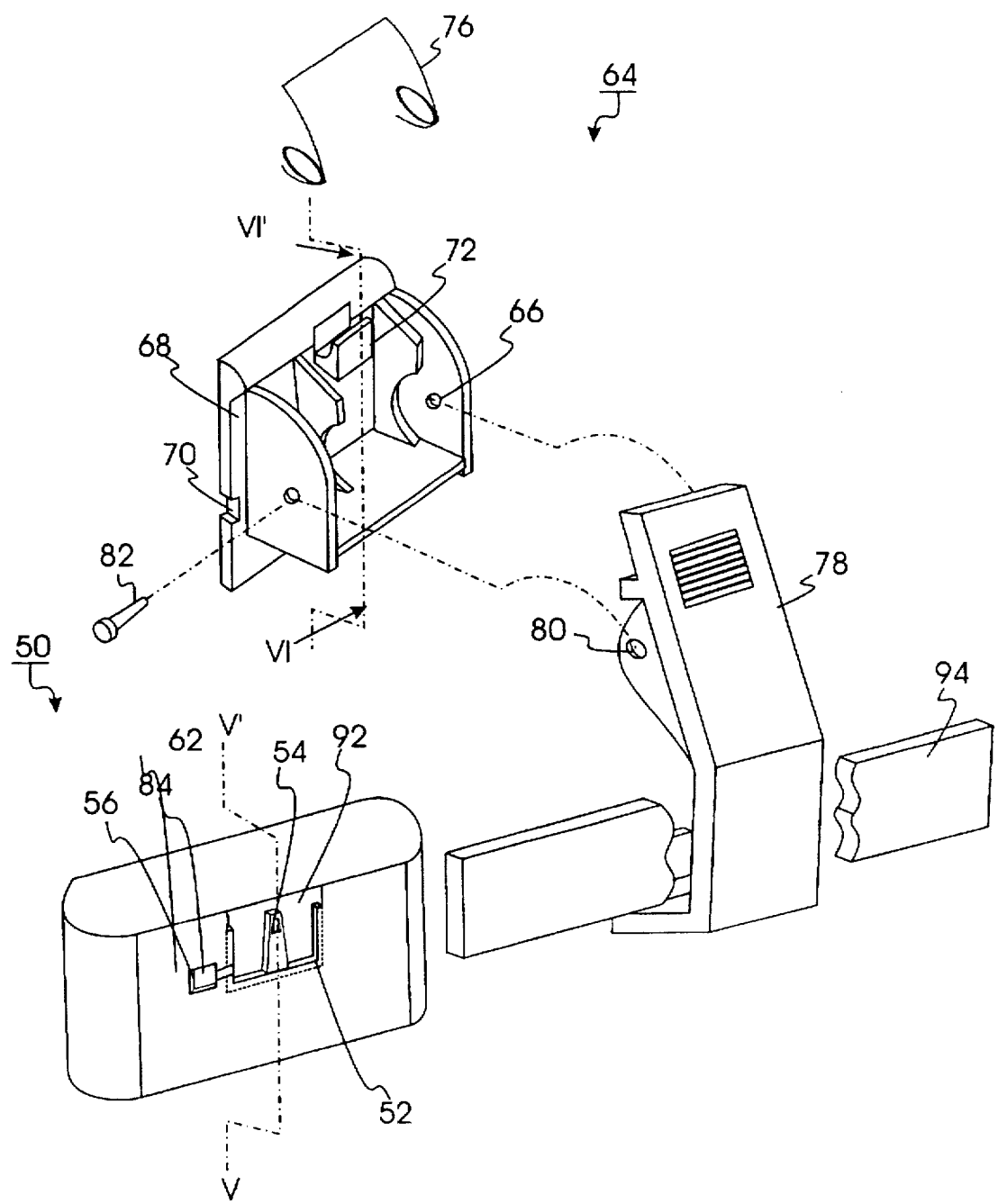
FIG. 3 is a partly exploded perspective view illustrating a double locking device of a belt clip constructed according to the present invention.
Figure 4:
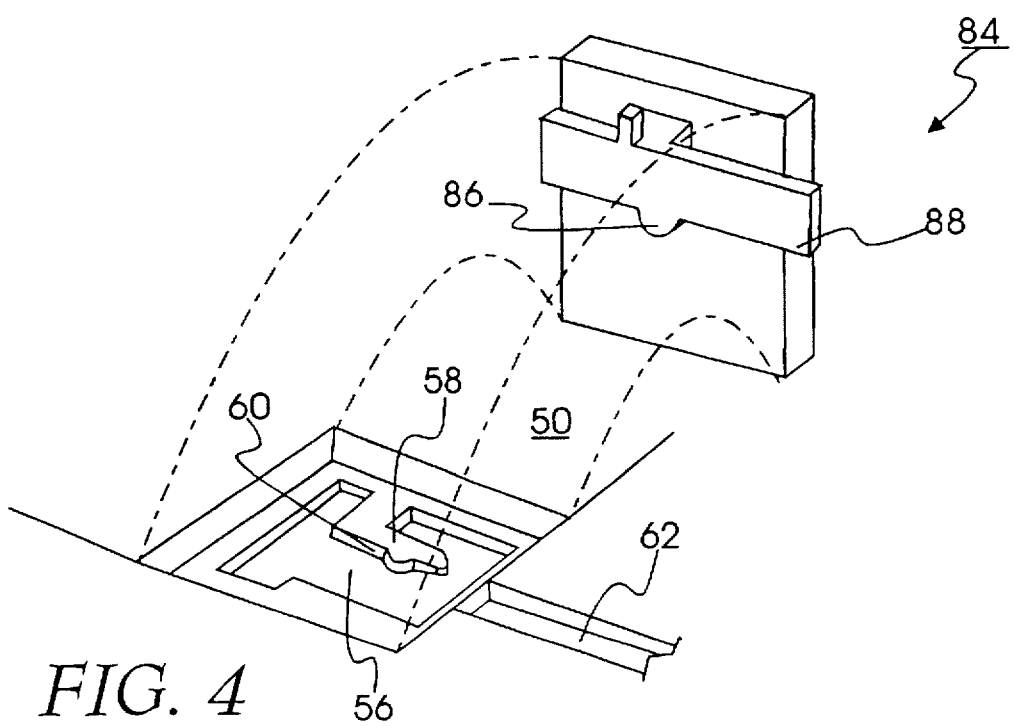
FIG. 4 is a partly exploded perspective view illustrating the first open region and the thumblatch lock of FIG. 3.
Figure 5:
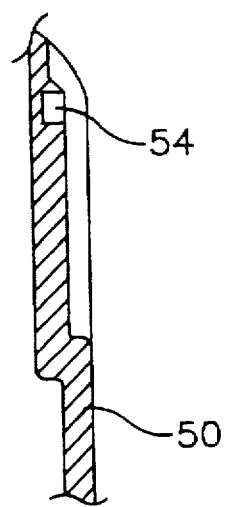
FIG. 5 side sectional view illustrating a pager housing taken along line V—V' of FIG. 3.
Figure 6:
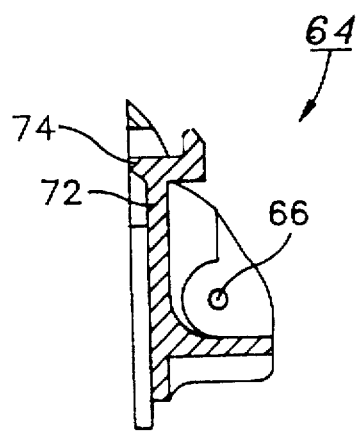
FIG. 6 side sectional view illustrating a belt clip holder taken along line VI—VI' of FIG. 3.

The pager housing is denoted by 50 in FIG. 3. On the pager housing 50, there are two open regions. The first open region is denoted by 56, and is the smaller of the two open regions. The first open region 56 will accommodate lock 84. The second of the two open regions is the larger of the two open regions and is denoted by 92. This second open region 92 accommodates the belt clip holder 64. Finally, lever 78 is attached to the belt clip holder 64 by a hinge shaft 82. A coil spring 76 causes lever 78 to rotatably engage pager housing 50. Between the lever 78 and the pager housing 50, the user's belt 94 extends. As a result, the pager body 50, the lever 78, and the belt clip holder 64 are attached together in unison to the belt 94 of the user.

Figure 9A:
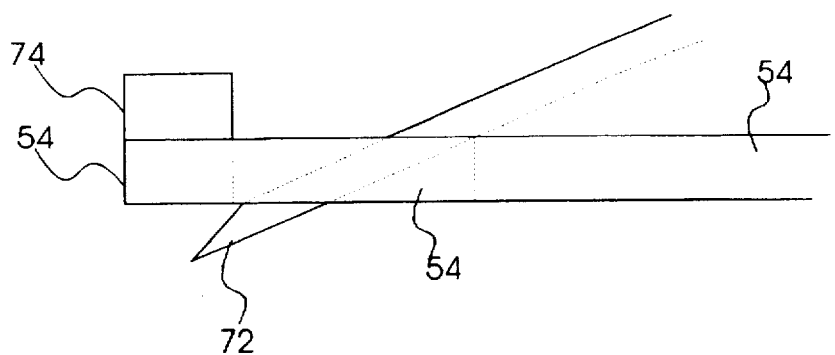
FIG. 9 is a top view of an enlargement of the cam activated locking mechanism incorporated into the second open region.
Figure 9B:
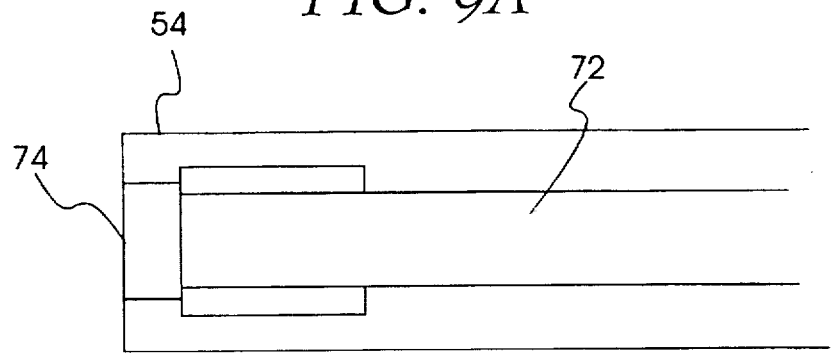

The pager housing is locked in the second open region 92. Belt clip holder 64 slides into the second open region 92 and fastened into place at hanging recess 54 shown in FIG. 3. Hanging recess 54 engages with hanging projection 74 found on the belt clip holder 64, as is shown in FIGS. 8 and 9. When the belt clip holder 64 slides onto the second open region 92 of pager housing 50, the guide rails 52 surrounding the second open region 92 engage the guide projections 68 surrounding the belt clip holder 64. As the belt clip holder 64 is pushed all the way into the second open region 92 of pager housing 50, the hanging recess 54 engages the hanging projection 74 of belt clip holder 64. The hanging recess 54 locks the hanging projection 74 into place. This operates by way of a camming action as illustrated by FIGS. 8, 9A and 9B.

Figure 10:
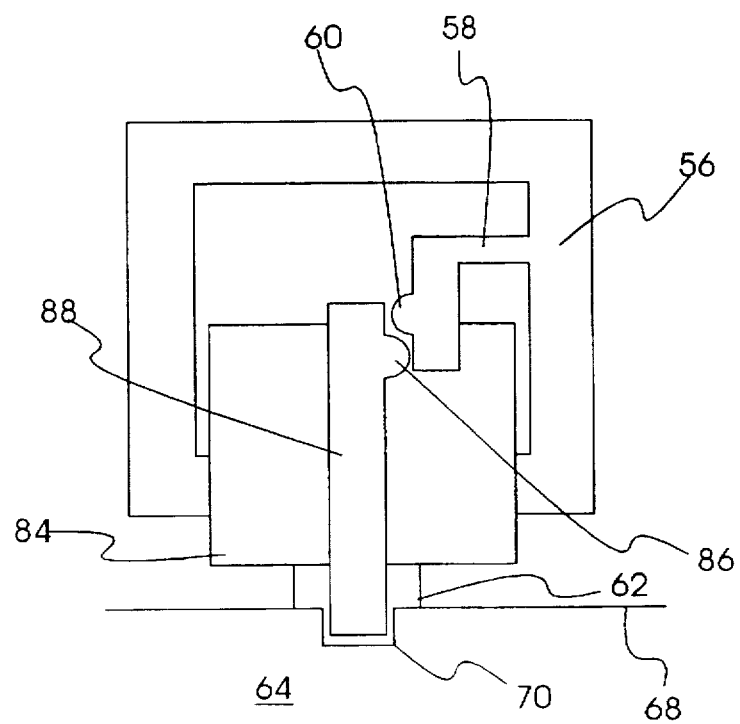
FIG. 10 is an enlargement of the cam activated locking mechanism for the thumblatch in the first open region.

After the belt clip holder 64 is locked into the second open region 92, the user locks the pager housing 50 in a second location by using lock 84. The user pushes thumblatch 84 found in the first open region 56 towards the belt clip holder 64 located in the second open region 92. As this occurs, channel 88 of the lock 84 slides along channel 62 towards belt clip holder 64. As this is done, two events occur simultaneously. First, tension part 86 of lock 84 engages with tension part 60 in the first open region 56 and locks lock 84 to the pager housing 50 by way of camming action. Tension parts 60 and 86 become locked as shown in FIG. 10. The second event that occurs is that stopper 88 of lock 84 slides into groove 70 of belt clip holder 64. This locks lock 84 to belt clip holder 64. As a result, the pager housing 50 is locked in two places to the belt clip holder 64.

As set forth in the forgoing, there is an advantage that the belt clip fixing device for a radio pager or some other item of communication equipment is provided with a double locking device, even though the user is careless and forgets to lock the device, that is, even though the lock is in a loose state, the hanging projection of the belt clip holder is always hooked into the hanging recess of the pager housing so that the belt clip is not detached from the pager housing, thereby preventing the loss and damage of the pager.

While there have been illustrated and described what are considered to be preferred embodiments of the present invention, it will be understood by those skilled in the art that various changes and modifications may be made, and equivalents may be substituted for elements thereof without departing from the true scope of the present invention.

What is claimed is:

1. A belt clip assembly of fixing a lever to a housing, comprising:

said lever including a hinge opening through which a hinge shaft passes;

a belt clip holder for engaging the lever with the housing so that said lever is turned around said hinge shaft within a predetermined angle, said belt clip holder being provided with a hinge opening through which said hinge shaft passes such as said hinge opening, a guide projection slid into the housing, a groove formed at one side of said guide projection, an elastic hanging rib situated in a center of said belt clip holder, and a hanging projection integrally formed on a end of said elastic hanging rib;

the housing including a guide rail into which said guide projection of said belt clip holder is slid, a hanging recess into which a hanging projection of said belt clip holder is put around a top portion and a center portion between the left and right of said guide rail, an opening provided with a tension part having a protrusion and formed at one side of said guide rail, and a guide channel formed between said opening and said guide rail;

a lock including a protrusion adapted to be in contact with said protrusion of a tension part, and a stopper adapted to be slid into said guide channel and to be put into said groove of said belt clip holder, thereby to lock said belt clip holder into the housing, said lock being engaged with said opening of the housing and locking said belt clip holder slid into said guide rail; and a coil spring having said lever turned elastically around said hinge shaft within a predetermined angle after being engaged with said belt clip holder, said coil spring being situated between said lever and said belt clip holder, said hinge shaft passes through said respective hinge openings, and engaging said lever with said belt clip holder, said belt clip holder is slid into said guide rail of the housing with said aid of said guide projection so that said hanging projection of said hanging rib is put into said hanging recess, and said lock is engaged with said opening of the housing with said stopper of said lock slides into said guide channel of the housing and said protrusion of said lock is adapted to be in contact with said protrusion of said tension part.

2. A belt clip assembly, comprising:

a housing having a plurality of open regions;

a cam disposed in each of the open regions;

a first rectangular member, positioned within a first of said open regions of said housing and including a stopper and means for engaging the cam of said first of said open regions;

a second rectangular member, positioned within a second of said open regions of said housing, having guide projections extending along a periphery received by a pair of guide rails of said second of said open regions of said housing, and a groove formed on one of said guide projections accommodating and locking with said stopper of said first rectangular member, said second rectangular member including means for engaging the cam of said second of said open regions;

a coil spring; and a lever rotatably engaging said second rectangular member by said coil spring, said coil spring turning said lever about a hinge shaft so that said lever engages with said housing.

3. The belt clip assembly of claim 2, comprising said first rectangular member moving in a direction orthogonal to said second rectangular member.

4. The belt clip assembly of claim 3, wherein said cam in said first open region comprises tension parts that are coplanar and flush to each other before, during and after camming action.

5. The belt clip assembly of claim 4, wherein said cam in said second open region comprises a hanging recess and said second rectangular member means for engaging the cam comprises a hanging projection, where said hanging recess and said hanging projection occur in different intersecting planes during and after camming action.

6. The belt clip assembly of claim 5, comprising a belt positioned between said lever and said housing.

7. The belt clip assembly of claim 2, wherein said first open region is orthogonal to said second open region.

8. The belt clip assembly of claim 7, comprising said cam of said thumblatch of said first open region is comprised of tension parts that are coplanar and flush to each other before, during and after camming action.

9. The belt clip assembly of claim 8 wherein said cam in said second open region includes a hanging recess and said second rectangular member means for engaging the cam includes a hanging projection where said hanging recess and said hanging projection occur in different intersecting planes during and after camming action.

10. The belt clip assembly of claim 9, comprising a belt lying between said lever and said housing.

11. A belt clip assembly, comprising:

a housing having a single continuous surface perforated by first and second rectangular open regions, each containing a locking cam, a thumblatch inserted into the first of said regions in an unlocked position, and a lever rotatably attached by a hinge to a belt clip holder;

said belt clip holder being inserted and locked into the second of said two open rectangular regions, said belt clip holder including means for engaging the cam of the second rectangular open region; and said thumblatch slidable into a locking position by movement toward said belt clip holder positioned within said second open rectangular region causing a stopper section of said thumblatch to lock with a groove in said belt clip holder, said thumblatch including a means for engaging the cam of the first rectangular open region.

12. The belt clip assembly of claim 11, said two open rectangular regions being orthogonal to each other.

13. The belt clip assembly of claim 12, wherein said cam in said first open region comprises tension parts that are coplanar and flush to each other before, during and after camming action.

14. The belt clip assembly of claim 13 wherein said cam in said second open region comprises a hanging recess and said second rectangular member comprises a hanging projection, where said hanging recess and said hanging projection occur in different intersecting planes during and after camming action.

15. The belt clip assembly of claim 14, comprising a belt positioned between said lever and said housing.

16. A belt clip assembly, comprising:

a housing having a first and second rectangular recess, said second rectangular recess surrounded by guide rails;

a cam disposed in each recess;

a first rectangular member, positioned within said first rectangular recess, said first rectangular member having a stopper that interlocks and engages with said groove on said second rectangular member, said first rectangular member including means for engaging the cam of said first rectangular recess;

a second rectangular member, positioned within said second rectangular recess, said second rectangular member having guide projections extending along a periphery and received by said guide rails of said second recess, said second recess having a groove for receiving a stopper of said first rectangular member, said second rectangular member including means for engaging the cam of said second rectangular recess;

a coil spring; and a lever rotatably engaging said second rectangular member by said coil spring, said coil spring turning said lever about a hinge shaft so that said lever engages with said housing.

17. The belt clip assembly of claim 16, said first rectangular recess being orthogonal to said second rectangular recess.

18. The belt clip assembly of claim 17, wherein said cam in said first recess comprises tension parts that are coplanar and flush to each other before, during and after camming action.

19. The belt clip assembly of claim 18, wherein said cam in said second recess comprises a hanging recess and said second rectangular member comprises a hanging projection, where said hanging recess and said hanging projection occur in different intersecting planes during and after camming action.

20. The belt clip assembly of claim 19, comprising a belt positioned between said lever and said housing.

* * * * *